US012675310B2

(12) United States Patent
Chen et al.

(10) Patent No.: US 12,675,310 B2
(45) Date of Patent: Jul. 7, 2026

(54) VIRTUAL MACHINE DEPLOYMENT BASED ON WORKLOAD AND HARDWARE IN A HYPER-CONVERGED INFRASTRUCTURE (HCI) ENVIRONMENT

(71) Applicant: Dell Products L.P., Round Rock, TX (US)

(72) Inventors: Kai Chen, Shanghai (CN); Hongwei Yue, Shanghai (CN); Yuyan Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 535 days.

(21) Appl. No.: 17/965,458

(22) Filed: Oct. 13, 2022

(65) Prior Publication Data

US 2024/0103899 A1      Mar. 28, 2024

(30) Foreign Application Priority Data

Sep. 27, 2022    (CN) .......................... 202211186420.4

(51) Int. Cl.
*G06F 9/455*          (2018.01)

(52) U.S. Cl.
CPC .. *G06F 9/45558* (2013.01); *G06F 2009/4557* (2013.01)

(58) Field of Classification Search
CPC ......... G06F 9/45558; G06F 2009/4557; G06F 9/5044; G06F 9/505; G06F 9/5077
See application file for complete search history.

(56) References Cited

U.S. PATENT DOCUMENTS

| | | | | |
|---|---|---|---|---|
| 11,150,932 B2 * | 10/2021 | Ramesh | .............. | G06F 9/45558 |
| 11,307,885 B1 * | 4/2022 | Luciano | .............. | G06F 9/45558 |
| 2009/0070771 A1 * | 3/2009 | Yuyitung | .............. | G06Q 10/06 713/323 |
| 2017/0344393 A1 * | 11/2017 | Ansari | .................. | G06F 9/5083 |

FOREIGN PATENT DOCUMENTS

| | | | | | |
|---|---|---|---|---|---|
| CN | 108920254 A | * | 11/2018 | ......... | G06F 9/45558 |

OTHER PUBLICATIONS

Xu et al. CN108920254A Description Translation, Nov. 30, 2018, <https://worldwide.espacenet.com/publicationDetails/description? CC=CN&NR=108920254A&KC=A&FT=D&ND=3&date=20181130 &DB=&locale=en_EP>, pp. 1-4 (Year: 2018).*

* cited by examiner

*Primary Examiner* — Aimee Li
*Assistant Examiner* — Hsing Chun Lin
(74) *Attorney, Agent, or Firm* — Jackson Walker L.L.P.

(57)          ABSTRACT

Disclosed systems and methods align virtual machines (VMs) with hyperconverged infrastructure (HCI)-based hardware based on a determination of the VM's character-istic type. Each cluster node may be provisioned with a specific combination of hardware. In some embodiments, disclosed methods include determining, for each of the plurality of nodes, a target workload type based at least in part on the combination of information handling resources provisioned on each node. Disclosed methods may manage deployment of the VMs among the cluster nodes based on one or more factors including a workload compatibility factor determined in accordance with a workload type of each VM and a target workload type of each node, where the target workload type may reflect a hardware characteristic of the node.

6 Claims, 2 Drawing Sheets

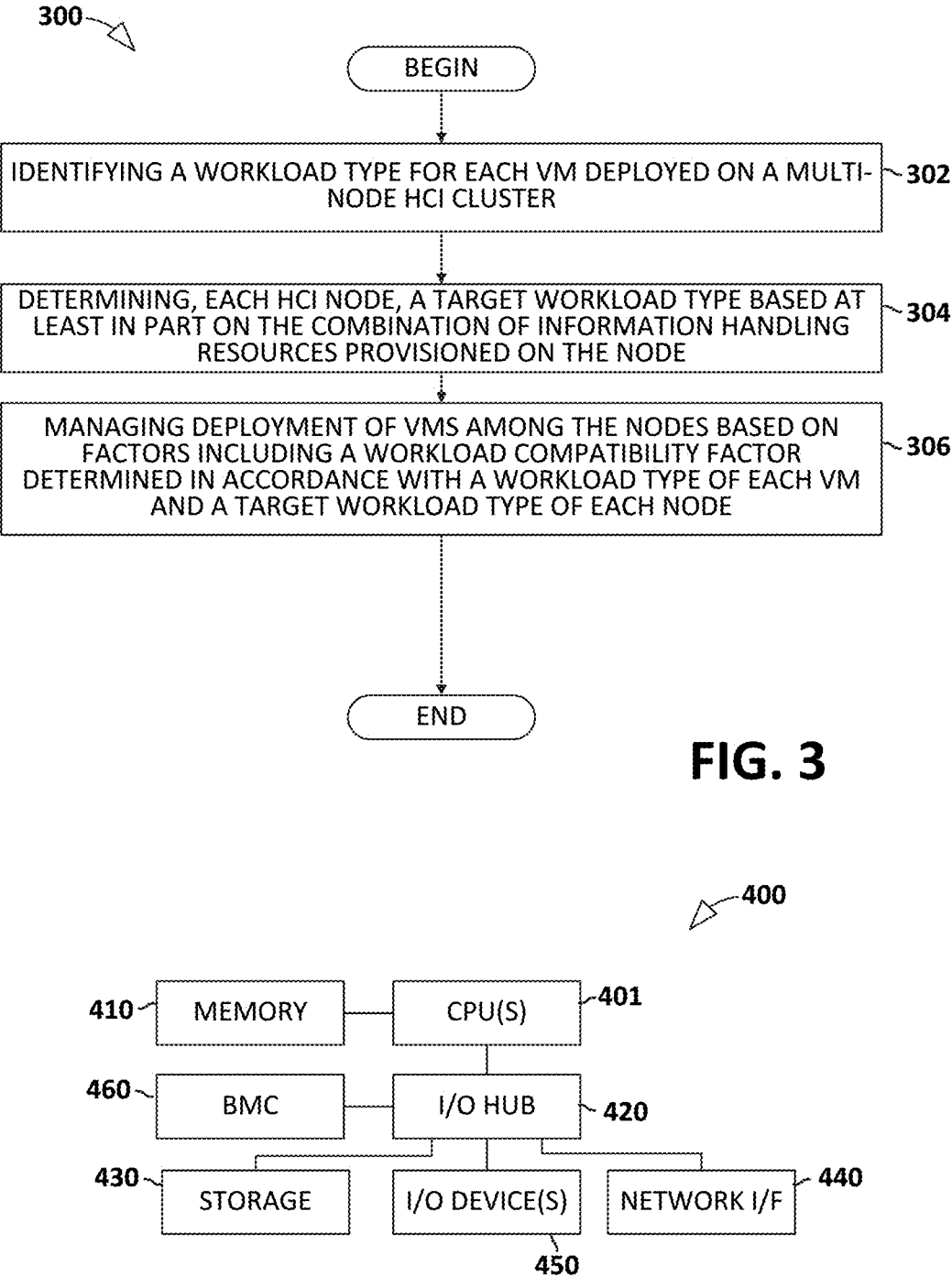

300

BEGIN

IDENTIFYING A WORKLOAD TYPE FOR EACH VM DEPLOYED ON A MULTI-NODE HCI CLUSTER — 302

DETERMINING, EACH HCI NODE, A TARGET WORKLOAD TYPE BASED AT LEAST IN PART ON THE COMBINATION OF INFORMATION HANDLING RESOURCES PROVISIONED ON THE NODE — 304

MANAGING DEPLOYMENT OF VMS AMONG THE NODES BASED ON FACTORS INCLUDING A WORKLOAD COMPATIBILITY FACTOR DETERMINED IN ACCORDANCE WITH A WORKLOAD TYPE OF EACH VM AND A TARGET WORKLOAD TYPE OF EACH NODE — 306

END

| 410 — MEMORY | 401 — CPU(S) |

| 460 — BMC | 420 — I/O HUB |

| 430 — STORAGE | I/O DEVICE(S) | 440 — NETWORK I/F |

VIRTUAL MACHINE DEPLOYMENT BASED ON WORKLOAD AND HARDWARE IN A HYPER-CONVERGED INFRASTRUCTURE (HCI) ENVIRONMENT

TECHNICAL FIELD

The present disclosure relates to information handling system management and, more particularly, managing deployments of virtualized information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyperconverged infrastructure (HCI) featuring virtualized compute, storage, and network resources with centralized and automated management. Original equipment manufacturers (OEMs) may provide HCI-based products and systems, such as VxRail HCI appliances from Dell Technologies, and these products may be offered in different configurations. As an example, some HCI appliance configurations may emphasize compute resources while other configurations may emphasize storage/memory resources. Virtual machines (VMs) and other virtualized resources that run on HCI appliances may have a characteristic workload that stresses a particular type of information handling resource. For example, some VMs may place primary stress on the hardware's storage resources while other VMs may stress compute resources. Typically, however, there is little or no coordination of virtualized workloads with hardware.

SUMMARY

Commercially distributed solutions enabling a virtual environment to automatically balance itself across hypervisors in a cluster to reduce resource contention. See, e.g., vSphere Distributed Resource Scheduler (DRS) from VMware. If a DRS cluster becomes unbalanced, DRS can migrate VMs from over-utilized resources hosts to under-utilized resources. DRS does not, however, consider the hardware platform when making balancing determinations. Common problems associated with the absence of coordination between virtualized resources running in an HCI environment and the hardware platforms that support the HCI environment, disclosed teachings support systems and methods for aligning VM workloads with HCI-based hardware. As an example, disclosed methods may identify a workload type for each of one or more virtual machines (VMs) deployed on a multi-node HCI cluster. Each cluster node may be provisioned with a specific combination of hardware and/or other types of information handling resource types. For example, some nodes may feature extensive compute resources while others may emphasize extensive storage resources. In some embodiments, disclosed methods include determining, for each of the plurality of nodes, a target workload type based at least in part on the combination of information handling resources provisioned on each node. Disclosed methods may manage deployment of the VMs among the cluster nodes based on one or more factors including a workload compatibility factor determined in accordance with a workload type of each VM and a target workload type of each node. As a non-limiting example, a cluster may feature one node configured with dense storage and another node configured with an extensive compute resources, e.g., CPUs and/or GPUs. In this example, characterization of a VM may determine that the VM is a storage intensive program. Based on this determination, disclosed methods may assign the storage intensive application with the storage-provisioned hosts.

The information handling resource types that an exemplary implementation of disclosed teachings might encompass include compute resources, storage resources, networking resources, and so forth. Some embodiments may distinguish between compute resources and performance resources, which may refer specifically to graphics processing unit (GPU) hardware. In some embodiments, the workload type for a VM may be determined based on the type of information handling resource most likely to be maximally utilized. The workload type for each VM may selected from a compute intensive type, a storage intensive type, a network intensive type, and a performance intensive type, among others. Identifying the workload type for a VM may include a machine learning based approach in which raw data corresponding to various compute, storage, network, and other metrics are collected. ML resources may include a feature engineering resources to identify various features from the raw data and to provide a training set for the ML resource. From the training data, the ML resource may be operable to create a predictive model and predictive model to identify workload types for each of the VMs.

Thus, disclosed systems and methods may employ machine learning to classify VM workloads and to optimize VM deployments so that VMs with a particular workload type execute on like-provisioned nodes, i.e., nodes with the same or similar workload type. By establishing VM-Host affinity, the hardware's capabilities are most fully utilized.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow diagram of a method 300 for management deployment of VMs in an HCI environment; and FIG. 4 illustrates an exemplary information handling system suitable for use in conjunction with FIG. 1 through FIG. 3.

DETAILED DESCRIPTION

Figure 1:
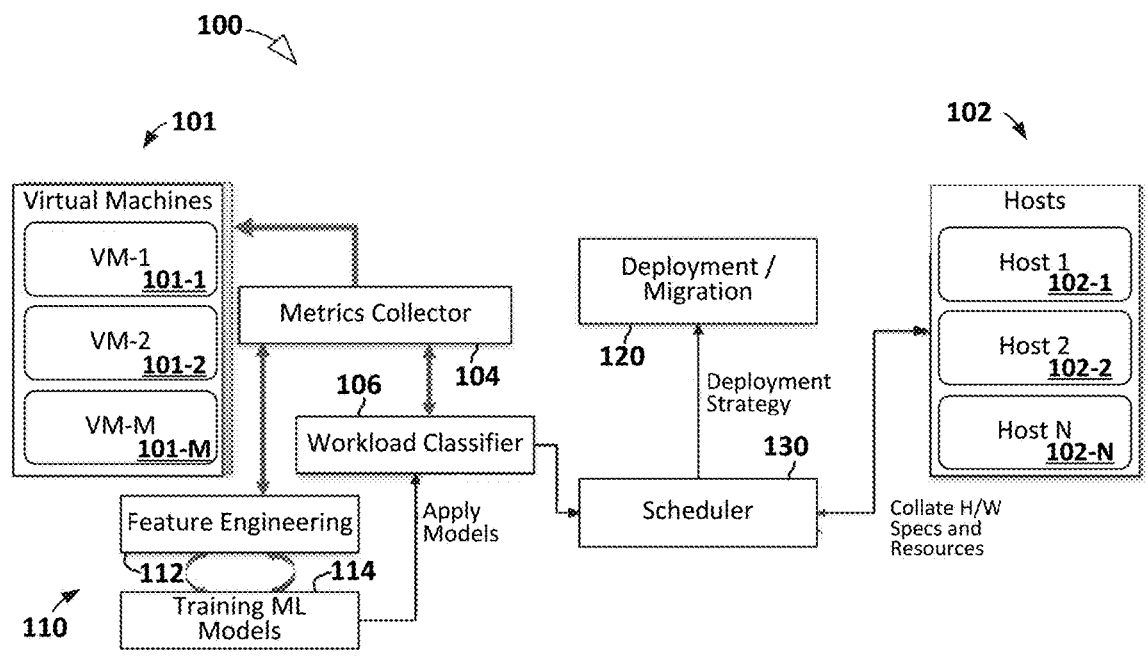
FIG. 1 illustrates an HCI platform suitable for implementing disclosed methods for managing VM deployments in an HCI environment.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary HCI platform 100 suitable for implementing disclosed features for managing deployment of VMs to cluster nodes based on a determination of a workload type for each VM and a target platform for each of the cluster nodes in an HCI environment. The illustrated platform 100 includes a plurality of N host systems 102, where N is greater than or equal to 3 in a typical case and may be as large as tens, hundreds, or greater, of which FIG. 1 depicts host systems 102-1, 102-2, and 102-N. In at least some embodiments, each host 102 represents a cluster node, which may correspond to a physical device such as a VxRail HCI appliance from Dell Technologies. In at least some such embodiments, hosts 102 may include a heterogeneous or diverse set of hardware configurations. In the case of hosts 102 implemented with VxRail appliances, for example, a number of different VxRail configurations may be available and each host 102 may represent one of the VxRail configurations. For example, the VxRail line of HCI appliances includes at least the following:

VxRail E series—a cost-effective, general platform.

VxRail P series—a performance-intensive or performance platform optimized for heavy workload including, without limitation, databases.

VxRail V series—a virtualization-extended graphics ready platform.

VxRail G Series—a general purpose platform for a broad range of HCI use cases.

VxRail S series—a storage and memory dense platform suitable for storage memory intensive.

FIG. 1 further illustrates a number (M) of VMs 101, of which FIG. 1 depicts VM-1 (101-1), VM-2 (101-2), and VM-N (101-N). Each VM 101 may be responsible for one or more particular functions and/or services and each VM may have a characteristic workload associated with it. For example, the types of VM workloads that a particular solution may recognize may include compute-intensive workloads, e.g., a web server such as Nginx, storage/memory-intensive workloads such as a Redis workload, and performance intensive workloads including, e.g., a database workload.

Generally, disclosed teachings manage VM deployments and migrations based on matching VMs 101, and their characteristic workloads, with a host 102 that is provisioned with hardware and other resources most appropriate for a the applicable VM workload. For example, assigning or migrating a storage intensive VM 101 to a storage dense host 102.

The HCI platform 100 depicted in FIG. 1 may include a metrics collector 104 suitable for obtaining raw data, include compute metrics, storage metrics, network metrics, and so forth from VMs 101 as the run on their assigned hosts. Metrics collector 104 is further illustrated communicatively coupled to a machine learning (ML) engine 110, which may be implemented in the cloud or on-premises. The illustrated ML engine 110 of FIG. 1 includes a feature engineering resource 112 and a training ML models resource 114.

As suggested by its name, feature engineering resource 112 may analyze raw data and transform it into features that can be used to create a predictive model using techniques such as statistical modeling, deep learning, etc. Feature engineering resource 112 may extract features from the raw data and provide training data to a training ML model 114 which may develop a predictive model that can be applied.

A workload classifier 106 of FIG. 1 may receive data from metrics collector 104 and communicate with ML model 114 to arrive at a workload type determination for each VM 101. The workload classifier 106 may communicate with a scheduler 130 coupled to a deployment/migration module 120. The illustrated scheduler 130 may also determine or receive an indication of hardware resources and specifications associated with each host 102. Scheduler 130 may then, in conjunction with deployment/migration resource 120, perform a matchmaking operation to align VMs 101 with the most suitable host 102. If, as an example, a storage-intensive VM 101 is currently executing on a compute-intensive host 102, then deployment/migration resource 120, in conjunction with scheduler 130, may initiate a migration of the VM from its existing sub-optimal resource.

Figure 2:
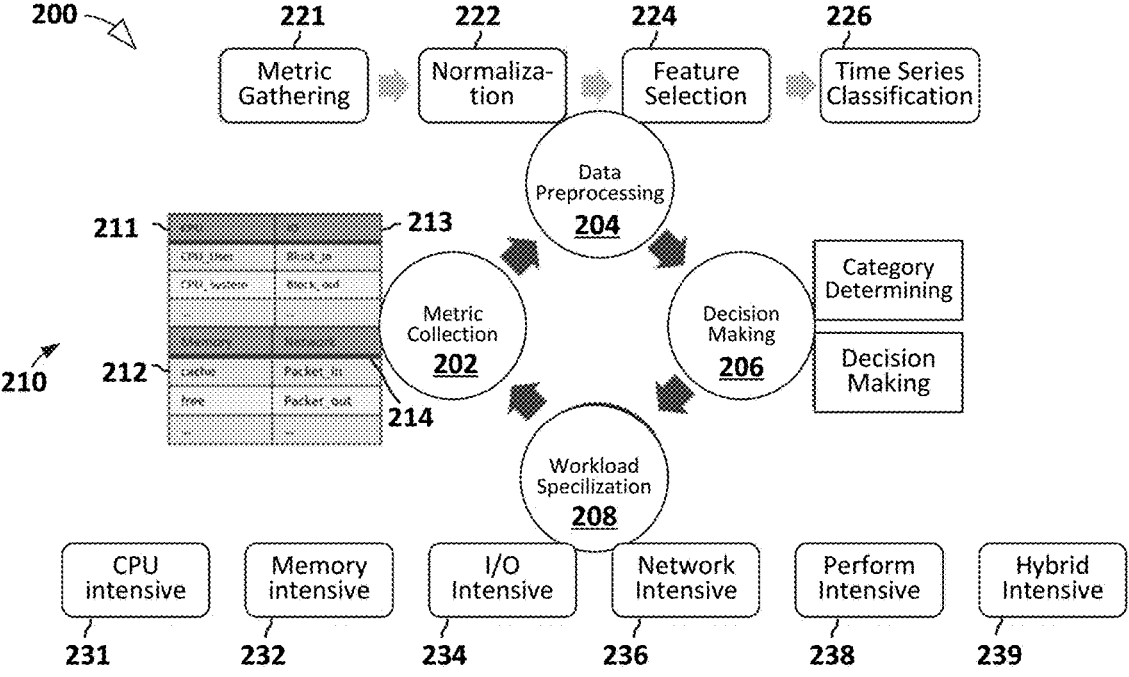
FIG. 2 illustrates an exemplary workload classification architecture for aligning VMs to hosts in accordance with disclosed teachings.

Referring now to FIG. 2, elements of a workload classification solution 200 in accordance with disclosed teachings are depicted. The illustrated solution 200 includes an iterative process in which metrics are collected (operation 202), data is pre-processed (operation 204), and, based on the pre-processing and a machine learning model, decisions are made (operation 206) regarding the classifications of VM workloads and hardware node target workloads. After workloads and nodes have been so classified, the illustrated solution 200 includes a workload specialization operation 208 during which workloads are deployed and migrated to achieve at least some degree of association between the type of VM workload and an appropriate cluster node. The illustrated solution 200 is particularly suitable for cases in which the virtual machine resources have a diversity of sensitivities to information handling resources and the node hardware has a similar diversity. In such deployments, the ability to identify and characterize the type of resources that a VM is likely to stress during execution, and match those resources with similarly configured hardware beneficially achieves a targeted performance during which the cluster nodes are likely to perform tasks and applications that are particularly suitable to the hardware implemented in the cluster node.

As depicted in FIG. 2, the metric collection operation 202 may retrieve metrics relating to a variety of hardware or information handling resource types including, as examples, CPU metrics 211, memory/storage metrics 212, I/O metrics 213, and network metrics 214. The decision making process 206 illustrated in FIG. 2 includes the determination of particular categories for each VM executing on the cluster and as well, a determination of a target workload for each of the cluster's physical nodes. In the embodiment depicted in FIG. 2, workload specialization operation 208 may be executed in the context of a finite and relatively small number of resource types. For example, FIG. 2 illustrates a collection of five hardware types including a CPU intensive type 231, memory intensive type 232, an I/O intensive type 234, a network intensive type 236, a performance intensive type 238, and the previously mentioned hybrid intensive type 239. FIG. 3 further illustrates, in connection with data pre-processing 204, a sequence of steps that may be suitably performed by machine learning resources illustrated and described above with respect to FIG. 1. In at least some embodiments, the illustrated data pre-processing may result in a progression from metric gathering 221, normalization 222 of the data to remove spurious and erroneous data, a feature extraction and selection 224 to define features for a training data and/or a predictive model, as well as operations 226 during which a time series classification may occur. Time series classification uses supervised machine learning to analyze multiple labeled classes of time series data and then predict or classify the class that a new data set belongs to.

Referring now to FIG. 3, a flow diagram illustrates a method 300 for managing VMs in an HCI environment in accordance with teachings disclosed herein. The illustrated method 300 includes identifying (operation 302) a workload type for each of one or more VMs deployed on a multi-node cluster in an HCI platform, in which each cluster node may be provisioned with a discoverable combination of information handling resource components and other resources. The method 300 illustrated in FIG. 3 further includes determining (operations 304), for each of the plurality of nodes, a target workload type based at least in part on the combination of information handling resources. The illustrated method still further includes managing (operation 306) deployment of VMs among the cluster nodes based on one or more factors including a workload compatibility factor determined in accordance with a workload type of each VM and a target workload type of each node. Disclosed systems and method may be especially valuable and useful when the node hardware in the cluster is implemented with a diversity of configurations.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method implemented in a hyperconverged infrastructure (HCI) platform, the HCI platform comprising a plurality of HCI clusters, each HCI cluster including a plurality of nodes with a combination of information handling resource types comprising at least compute resources, storage resources, and networking resources, the method comprising:

identifying, by a workload classification subsystem executing in the HCI platform, a workload type for each respective VM of a plurality of virtual machines (VMs) deployed on the HCI platform, wherein identifying the workload type for each respective VM comprises:

collecting, by a metrics collector, metrics indicative of information handling system resources utilized by the respective VM, the metrics regarding at least CPU, memory, I/O, and network;

preprocessing the metrics to normalize and filter the metrics and to produce features for the respective VM; and applying a machine-learning model to the features for the respective VM to output the workload type for the respective VM selected from a set comprising compute-intensive, storage-intensive, network-intensive, and performance-intensive types;

determining, for each respective node of the plurality of nodes, a target workload type based at least in part on a resource profile of the respective node derived from the combination of information handling resource types provisioned on the respective node, the resource profile comprising capacity indicators for the compute resources, the storage resources, and the networking resources provisioned on the respective node;

computing, for each respective VM and for each respective node, a respective workload compatibility factor that is a function of the workload type identified for the respective VM and the target workload type determined for the respective node;

deploying, by a scheduler, the plurality of VMs among the plurality of nodes based on the respective workload compatibility factors, including initiating placement or migration of one or more VMs of the plurality of VMs to nodes of the plurality of nodes having a respective higher workload compatibility factor; and executing the one or more VMs on the nodes having the respective higher workload compatibility factor.

2. The method of claim 1, wherein the workload type for the respective VM is determined based on an information handling resource type most stressed by the respective VM.

3. An information handling system comprising:

a central processing unit (CPU); and a memory, accessible to the CPU, and including processor executable instructions that, when executed by the processor, cause the processor to perform operations, implemented in a hyperconverged infrastructure (HCI) platform, the HCI platform comprising a plurality of HCI clusters, each HCI cluster including a plurality of nodes provisioned with a combination of information handling resource types comprising at least compute resources, storage resources, and networking resources, the operations including:

identifying, by a workload classification subsystem executing in the HCI platform, a workload type for each respective VM of a plurality of virtual machines (VMs) deployed on the HCI platform, wherein identifying the workload type for each respective VM comprises:

collecting, by a metrics collector, metrics indicative of information handling system resources utilized by the respective VM, the metrics regarding at least CPU, memory, I/O, and network;

preprocessing the metrics to normalize and filter the metrics and to produce features for the respective VM; and applying a machine-learning model to the features for the respective VM to output the workload type for the respective VM selected from a set comprising compute-intensive, storage-intensive, network-intensive, and performance-intensive types;

determining, for each respective node of the plurality of nodes, a target workload type based at least in part on a resource profile of the respective node derived from the combination of information handling resource types provisioned on the respective node, the resource profile comprising capacity indicators for the compute resources, the storage resources, and the networking resources provisioned on the respective node;

computing, for each respective VM and for each respective node, a respective workload compatibility factor that is a function of the workload type identified for the respective VM and the target workload type determined for the respective node;

deploying, by a scheduler, the plurality of VMs among the plurality of nodes based on the respective workload compatibility factors, including initiating placement or migration of one or more VMs of the plurality of VMs to nodes of the plurality of nodes having a respective higher workload compatibility factor; and executing the one or more VMs on the nodes having the respective higher workload compatibility factor.

4. The information handling system of claim 3, wherein the workload type is determined based on an information handling resource type most stressed by the respective VM.

5. A non-transitory computer readable medium, comprising processor-executable instructions executable by a processor implemented in a hyperconverged infrastructure (HCI) platform, the HCI platform comprising a plurality of HCI clusters, each HCI cluster including a plurality of nodes and each respective node provisioned with a combination of information handling resource types comprising at least compute resources, storage resources, and networking resources, the instructions including:

identifying, by a workload classification subsystem executing in the HCI platform, a workload type for each respective VM of a plurality of virtual machines (VMs) deployed on the HCI platform, wherein identifying the workload type for each respective VM comprises:

collecting, by a metrics collector, metrics indicative of information handling system resources utilized by the respective VM, the metrics regarding at least CPU, memory, I/O, and network;

preprocessing the metrics to normalize and filter the metrics and to produce features for the respective VM; and applying a machine-learning model to the features for the respective VM to output the workload type for the respective VM selected from a set comprising compute-intensive, storage-intensive, network-intensive, and performance-intensive types;

determining, for each respective node of the plurality of nodes, a target workload type based at least in part on a resource profile of the respective node derived from the combination of information handling resource types provisioned on the respective node, the resource profile comprising capacity indicators for the compute resources, the storage resources, and the networking resources provisioned on the respective node;

computing, for each respective VM and for each respective node, a respective workload compatibility factor that is a function of the workload type identified for the respective VM and the target workload type determined for the respective node;

deploying, by a scheduler, the plurality of VMs among the plurality of nodes based on the respective workload compatibility factors, including initiating placement or migration of one or more VMs of the plurality of VMs to nodes of the plurality of nodes having a respective higher workload compatibility factor; and executing the one or more VMs on the nodes having the respective higher workload compatibility factor.

6. The non-transitory computer readable medium of claim 5, wherein the workload type is determined based on an information handling resource type most stressed by the respective VM.

* * * * *